United States Patent [19]

Rose et al.

[11] 4,446,294

[45] May 1, 1984

[54] AROMATIC ETHERKETONE/SULPHONE COPOLYMERS

[75] Inventors: John B. Rose; Michael B. Cinderey, both of Hertfordshire, England

[73] Assignee: Imperial Chemical Industries PLC, London, England

[21] Appl. No.: 504,476

[22] Filed: Jun. 15, 1983

[30] Foreign Application Priority Data

Jul. 30, 1982 [GB] United Kingdom ............... 8222063

[51] Int. Cl.³ .............................................. C08G 65/40
[52] U.S. Cl. ..................................... 528/128; 528/174
[58] Field of Search ........................ 528/125, 128, 174

[56] References Cited

U.S. PATENT DOCUMENTS

| | | | |
|---|---|---|---|
| 3,886,120 | 5/1975 | Yagi et al. | 528/128 |
| 4,108,837 | 8/1978 | Johnson et al. | 528/128 |
| 4,113,698 | 9/1978 | Staniland | 528/128 |
| 4,268,650 | 5/1981 | Rose | 528/128 |
| 4,296,217 | 10/1981 | Stuart-Webb | 528/128 |
| 4,320,222 | 3/1982 | Rose et al. | 528/128 |
| 4,320,224 | 3/1982 | Rose et al. | 528/128 |
| 4,331,798 | 5/1982 | Staniland | 528/128 |
| 4,339,568 | 7/1982 | Maresca | 528/128 |

FOREIGN PATENT DOCUMENTS 1078234 8/1967 United Kingdom .

Primary Examiner—Lester L. Lee
Attorney, Agent, or Firm—Cushman, Darby & Cushman

[57] ABSTRACT

Amorphous aromatic etherketone/sulphone copolymers, normally of reduced viscosity $\geq 0.8$, containing 15 to 70 mole % (preferably 20 to 60 mole %) of repeat units of formula

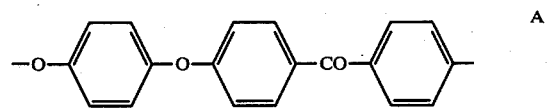

A and correspondingly 85 to 30 mole % (preferably 80 to 40 mole %) of repeat units of formula

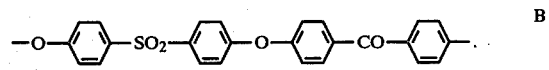

B

4 Claims, No Drawings

AROMATIC ETHERKETONE/SULPHONE COPOLYMERS

The present invention relates to certain aromatic etherketone/sulphone copolymers.

Thermoplastic aromatic polyetherketones of a crystalline nature and containing the repeat units

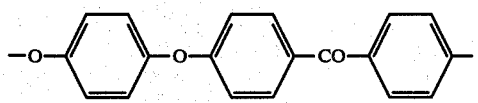

alone or in conjunction with other repeat units, said polymer having an inherent viscosity IV of at least 0.7 (which corresponds to a reduced viscosity RV of at least 0.8), have been disclosed in European Patent Publication No. 0 001 879. These aromatic polyetherketones, possessing a relatively high degree of crystallinity, are exceptionally useful materials in that they exhibit very high melting points, and excellent mechanical and electrical properties, coupled with outstanding thermal and combustion characteristics. They also show resistance to an extremely wide range of solvents and proprietary fluids. They are thus very suitable for use in applications where the service conditions are too demanding for the more established engineering plastics and in particular where the polymers are liable to high service temperatures. They may be fabricated into any desired shape, e.g. mouldings, coatings, films or fibres.

RV in European Patent Publication No. 0 001 879 and in this specification is measured at 25° C. on a solution of the polymer in concentrated sulphuric acid of density 1.84 g.cm$^{-3}$, said solution containing 1 g of polymer per 100 cm$^3$ of solution the measurement being taken immediately after dissolution is complete to minimise the effect of sulphonation. IV in European Patent Application No. 0 001 879 is measured at 25° C. on a solution of the polymer in concentrated sulphuric acid of density 1.84 g cm$^{-3}$, said solution containing 0.1 g of polymer per 100 cm$^3$ of solution.

While the crystalline aromatic polyetherketones are tough materials in an unnotched fabricated state, their notched impact strength is on the low side, particularly if the polymers contain solely repeat units A.

Thermoplastic aromatic polyetherketone/sulphones consisting of the repeat unit

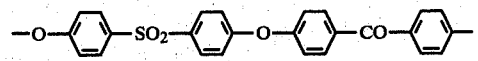

have been disclosed in GB No. 1 078 234. These are completely amorphous polymers but do possess significantly higher notched impact strength than crystalline polyetherketones containing repeat unit A.

We have now discovered a class of thermoplastic aromatic etherketone/sulphone copolymers containing units A and B which possess outstandingly high notched impact strength.

According to the present invention there is provided an aromatic etherketone/sulphone copolymer containing 15 to 70 mole % (preferably 20 to 60 mole %) of repeat units of formula

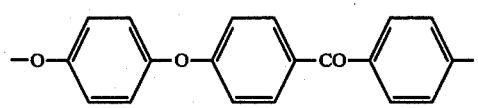

and correspondingly 85 to 30 mole % (preferably 80 to 40 mole %) of repeat units of formula

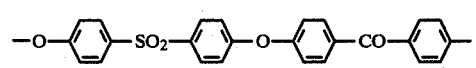

These copolymers are amorphous, the level of 70 mole % A corresponding approximately to the onset of crystallinity. The copolymers of the invention surprisingly possess significantly improved notched impact strength in comparison to amorphous polymers containing only repeat units B, as well as greater impact strength in comparison to crystalline polymers containing only repeat units A or repeat units A and B. The copolymers particularly contain 40 to 60 mole % of units A and 60 to 40 mole % of units B.

The copolymers of the present invention normally have RV of at least 0.8, and more usually of at least 1.0.

The aromatic etherketone/sulphone copolymers of the present invention may be conveniently prepared by condensation of appropriate proportions of hydroquinone, 4,4'-dihydroxy-diphenylsulphone, and 4,4'-difluoro-benzophenone in the presence of an alkali metal carbonate or bicarbonate and an aromatic sulphone solvent—as described generally in European Patent Publication No. 0 001 879.

The present invention is now illustrated by the following Examples. Comparative examples are denoted by the prefix C.

EXAMPLE C1

4,4'-Dihydroxy-diphenylsulphone (87.60 g; 0.350 mole), 4,4'-difluorobenzophenone (77.13 g; 0.3535 mole) and 225 g diphenyl sulphone were charged to a 500 ml flask which was purged with a stream of nitrogen. The mixture was melted by heating to 180° C. using an oil bath. Potassium carbonate powder (49.34 g, 0.357 mole) was gradually added to the stirred melt followed by 35 ml chlorobenzene (to act as an azeotrope-former). The reaction mixture was heated at 200° C. for 1 hour, 230° C. for 1 hour, 260° C. for 1 hour and 290° C. for 3 hours, and the reaction finally end-stopped with 4,4'-di-fluorobenzo-phenone (0.8 g; 0.0035 mole). The mixture was poured into water to yield an off-white lace. The polymer was worked-up by washing with methanol/water, water/acetic acid, and methanol/acetone.

The polymer obtained had the repeat units B only and the yield achieved was 140.5 g (93.5%).

The properties of this polymer are given in the Table.

EXAMPLE 2

The procedure employed was substantially that of Example C1 except that the phenolic component of the reaction mixture consisted of hydroquinone (7.71 g; 0.070 mole) and 4,4'-dihydroxy-diphenylsulphone (70.08 g; 0.280 mole), the amount of diphenyl sulphone used was 211 g, and the heating of 290° C. was for 2.5 hours.

The copolymer obtained had the repeat units A (20 mole %) and B (80 mole %) and the yield achieved was 130.9 g (93%).

The properties of this copolymer are given in the Table.

EXAMPLE 3

The procedure employed was substantially that of Example C1 except that the following components were used: hydroquinone (17.62 g; 0.160 mole), 4,4'-dihydroxy-diphenylsulphone (60.07 g; 0.240 mole) 4,4'-difluorobenzophenone (88.15 g; 0.404 mole), 224 g diphenyl sulphone, potassium carbonate (56.39 g; 0.408 mole), and 40 ml chlorobenzene. Also the heating at 290° C. was for 2 hours.

The copolymer obtained had the repeat units A (40 mole %) and B (60 mole %). The yield achieved was 135.6 g (91%).

The properties of this copolymer are given in the Table.

EXAMPLE 4

The procedure employed was substantially that of Example 3 except that the phenolic component of the reaction mixture consisted of hydroquinone (26.43 g; 0.240 mole) and 4,4'-dihydroxy-diphenylsulphone (40.04 g; 0.16 mole), the amount of diphenyl sulphone was used 207 g, and the heating at 290° C. was for 1.5 hours.

The copolymer obtained had the repeat units A (60 mole %) and B (40 mole %). The yield achieved was 129.9 g (94%).

The properties of this copolymer are given in the Table.

EXAMPLE C5

The procedure employed was substantially that of Example 3 except that the following components were used: hydroquinone (39.64 g; 0.360 mole), 4,4'-dihydroxy-diphenylsulphone (22.53 g; 0.090 mole), 4,4'-difluorobenzophenone (99.17 g; 0.4545 mole), 214 g diphenylsulphone, potassium carbonate (63.44 g; 0.459 mole) and 45 ml chlorobenzene. Also, the reaction mixture, after heating for only 0.5 hour at 290° C. when a further 28 g diphenylsulphone were added, was additionally heated at 300° C. for 2 hours.

The copolymer obtained had the repeat units A (80 mole %) and B (20 mole %). The yield achieved was 123.3 g (86%).

The properties of this copolymer are given in the Table.

EXAMPLE C6

The procedure employed was substantially that of Example 3 (using a 1 liter flask) except that the following components were used: hydroquinone (49.55 g; 0.450 mole), 4,4'-dihydroxy-diphenylsulphone (12.51 g; 0.050 mole), 4,4'-difluoro-benzophenone (109.65 g; 0.5025 mole), 300 g diphenylsulphone, a mixture of sodium carbonate (53.00 g; 0.500 mole) and potassium carbonate (1.38 g; 0.010 mole), and 50 ml chlorobenzene. The heating profile was: 200° C. for 1 hour, 230° C. for 1 hour, 260° C. for 1 hour and 300° C. for 1.25 hours.

The copolymer obtained had the repeat units A (90 mole %) and B (10 mole %).

The properties of this copolymer are given in the Table.

EXAMPLE C7

The procedure employed was substantially that of Example C6 except the phenolic component consisted only of hydroquinone (55.06 g; 0.500 mole), and the heating at 300° C. was for 2 hours.

The polymer obtained had the repeat units A only. The yield achieved was 118.9 g (82%).

The properties of this polymer are given in the Table.

| Ex No | Polymer Composition (A/B mole %) | RV | Tg (°C.) | Tm (°C.) | Amorphous (Am) or Crystalline (Cr) | Notched Impact Strength (2mm notch) (KJm$^{-2}$) (median value) |
|---|---|---|---|---|---|---|
| C1 | 0/100 | 1.2 | 195 | — | Am | 181 |
| 2 | 20/80 | 1.0 | 186 | — | Am | 201 |
| 3 | 40/60 | 1.1 | 179 | — | Am | ca. 216* |
| 4 | 60/40 | 1.2 | 171 | — | Am | ca. 235* |
| C5 | 80/20 | 1.1 | 161 | 321 | Cr | 175 |
| C6 | 90/10 | 1.8 | 156 | 322 | Cr | 186 |
| C7 | 100/0 | 1.6 | 150 | 335 | Cr | 76 |

Notched impact strength samples (2 mm notch) were prepared from 3.2 mm thick plaques. These plaques were made by compression moulding the amorphous polymer powders into 1 mm thick film at about 70° C. above Tg (10 tons pressure for about 4 minutes) and then compression moulding the film into plaques at about 90° C. above Tg (20 tons for 6 minutes). The crystalline polymers were moulded at 30°-40° C. above Tm to make the film and 20° C. higher (i.e. 50°-60° C. above the Tm) to produce the plaques. Samples were conditioned at 23° C./50% relative humidity for three days before testing (unaged) using a Hounsfield Impact Tester.

It can be seen that the amorphous copolymers of the present invention possess outstandingly high notched impact strength.

We claim:

1. An amorphous aromatic etherketone/sulphone copolymer containing 15 to 70 mole % of repeat units of formula

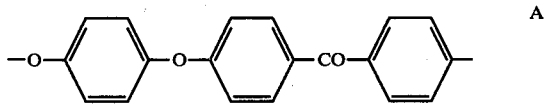

A and correspondingly 85 to 30 mole % of repeat units of formula

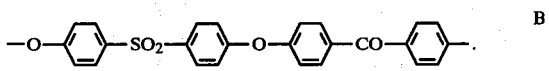

B

2. An etherketone/sulphone copolymer according to claim 1, containing 20 to 60 mole % of repeat units A and correspondingly 80 to 40 mole % of repeat units B.

3. An etherketone/sulphone copolymer according to claim 1 which has reduced viscosity RV of at least 0.8.

4. An etherketone/sulphone copolymer according to claim 3 which has reduced viscosity RV of at least 1.0.

* * * * *